Sept. 19, 1944.  J. F. O'BRIEN  2,358,346
FEED UNIT FOR ELECTRIC WIRING SYSTEMS
Filed June 26, 1941  2 Sheets-Sheet 1
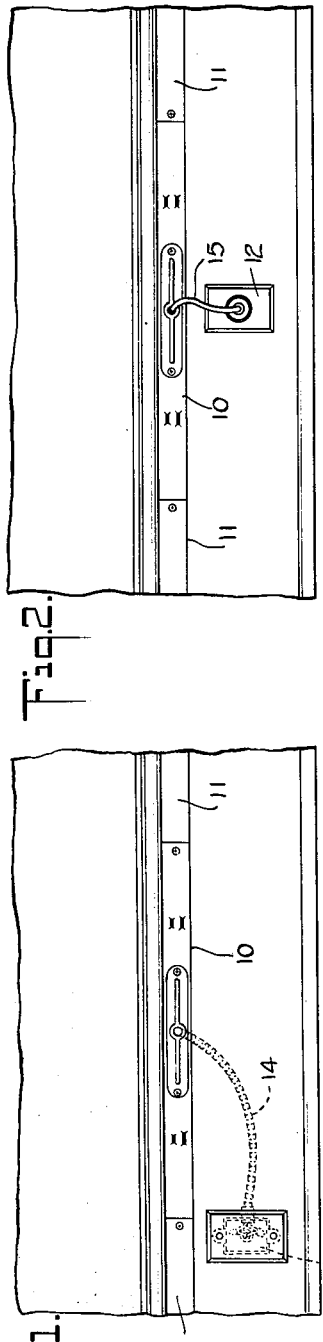
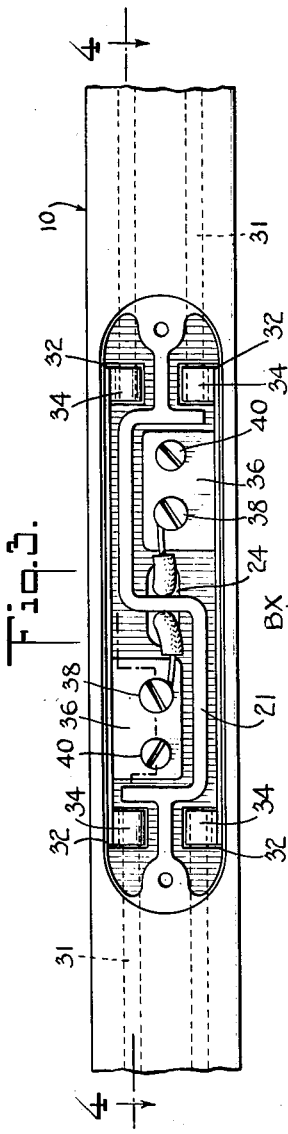
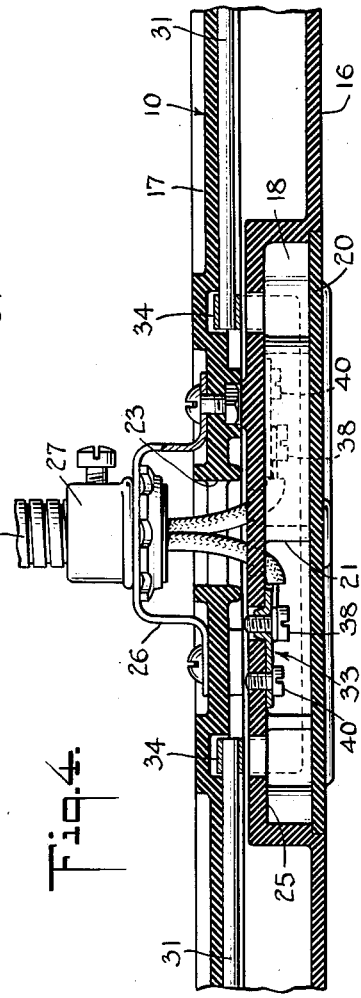
INVENTOR
Joseph F. O'Brien
HIS ATTORNEY Sept. 19, 1944. J. F. O'BRIEN 2,358,346
FEED UNIT FOR ELECTRIC WIRING SYSTEMS
Filed June 26, 1941 2 Sheets-Sheet 2
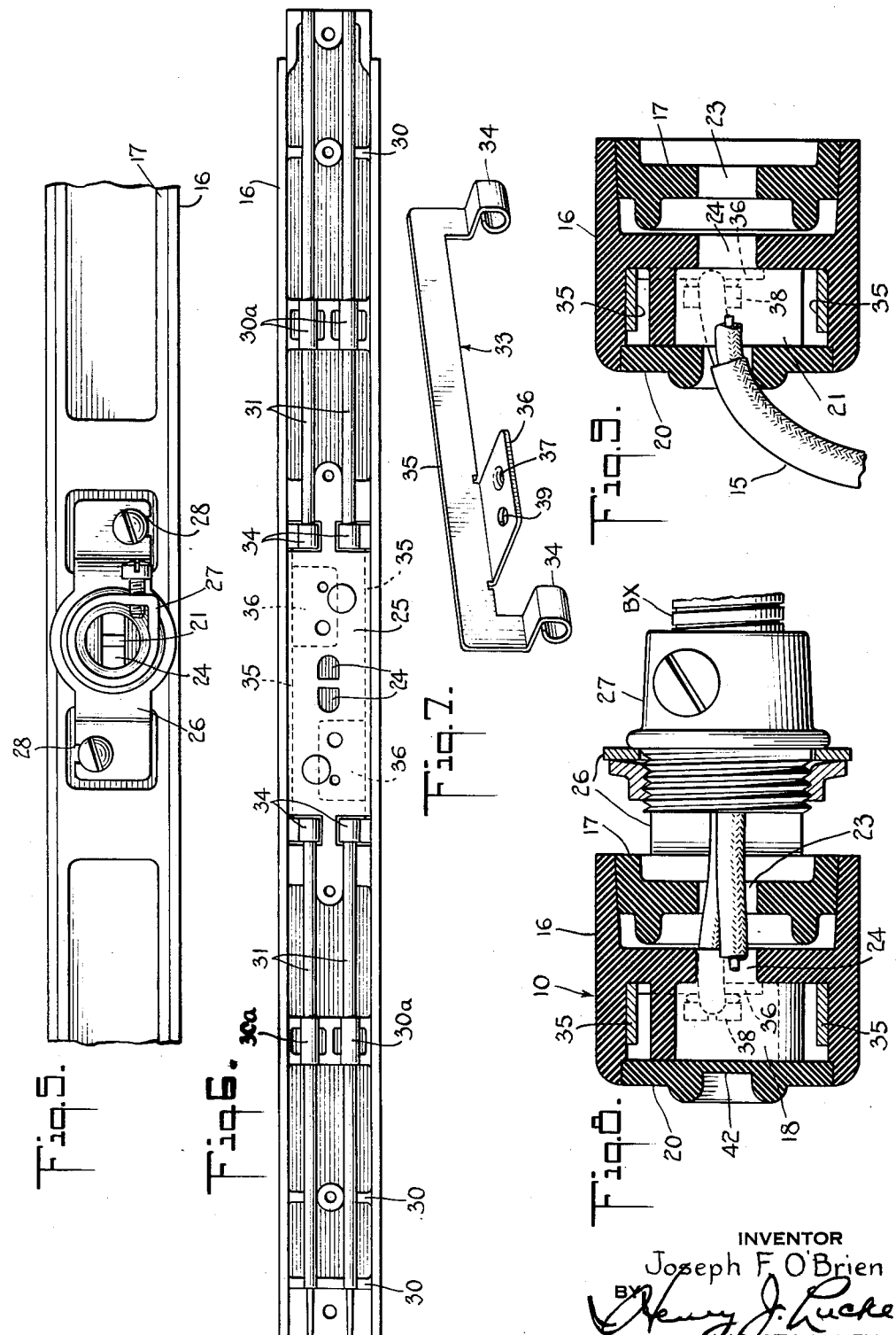
INVENTOR
Joseph F. O'Brien
BY
HIS ATTORNEY Patented Sept. 19, 1944

2,358,346

UNITED STATES PATENT OFFICE 2,358,346

FEED UNIT FOR ELECTRIC WIRING SYSTEMS

Joseph F. O'Brien, Jersey City, N. J., assignor to John B. Pierce Foundation, New York, N. Y., a corporation of New York Application June 26, 1941, Serial No. 399,888

10 Claims. (Cl. 173—334.1)

This invention relates to electric wiring systems involving electricity conductor units arranged in series and adapted for installation on the surface of a wall of a room or at the baseboard thereof. In particular, the invention relates to a unit of such wiring system adapted to form the means of connecting such a wiring system to the "feed" or power-source electricity conductors in the building.

It is an object of the invention to provide a "feed" unit of an electric wiring system embodying improved means for the interconnection thereof with the building electric supply.

In one form of the invention, means are provided whereby such "feed" unit may be connected, optionally, to concealed power-source conductors or to conductors available only through the agency of a conventional electric outlet box or equivalent. The latter arrangement renders the "feed" unit embodying the present invention particularly suitable in installations where the primary wiring of the building is completely installed, and where it may be impracticable or undesirable to attempt to connect the instant electric wiring system to concealed wiring.

A preferred form of the instant invention embodies a substantially hollow body having an external configuration matching the configuration of adjacent units of the complete system. Within the body are a suitable plurality of electricity conductors having exposed terminals at the extreme ends for electrical connection with the conductors of adjacent units. The electricity conductors do not extend continuously in the same form throughout the units; conductors of identical polarity are arranged in such manner that there is a substantial gap between their inner terminals. In the zone of such terminus of the conductors, the body of the unit has a pocket or connection well of suitable dimension. Within said pocket are connection terminals to which the live or power leads of a building may be connected; said terminals extend through a rear wall of the connection well into electric connection with the conductors disposed beneath the connection well as hereinafter set forth. Desirably, there is one such bus bar means for each organization of conductors of identical polarity.

Preferably, the electricity conductors of the unit are arranged in mutually insulated status beneath a base wall of the pocket, and are inaccessible from the front of the unit except in a circumstance where it is desired to have outlet facilities. Further to eliminate possibility of short circuit between the conductors, the connection well may be provided with an insulating wall which separates the otherwise exposed bus bar means therein.

The base wall of the pocket is provided with an aperture to permit the passage of electricity conductors of a main power source into the pocket for juncture with the respective connection terminals.

The pocket is provided with a removable cover which, in one form, may have a knock-out through which the connection of the unit with the power source of the building may be made if installation conditions so require.

Among the advantages of the electricity conductor unit according to the present invention, therefore, are the facility with which connection of the unit with the power leads may be made either from the rear of the unit or from the front, and the protection against short circuiting afforded by the arrangement of the conductors and bus bars within the unit.

Other features and advantages will hereinafter appear.

In the accompanying drawings:

Fig. 1 is an elevation of a portion of a room, showing an electricity conductor unit embodying the present invention installed and connected to a power source;

Fig. 2 is similar to Fig. 1 but illustrates a second method of connecting the said electricity conductor unit;

Fig. 3 is an enlarged front view of a portion of an electricity conductor unit with the cover plate removed;

Fig. 4 is a sectional elevation, taken on lines 4—4 of Fig. 3;

Fig. 5 is a rear view of a portion of the unit, illustrating the BX cable connector therefor;

Fig. 6 is a rear view of the cap member of the unit, showing a preferred arrangement of electricity conductors therein;

Fig. 7 is a perspective of one of the bus bars of said unit;

Fig. 8 is a transverse section of a unit taken at the point of interconnection of the BX cable therewith; and Fig. 9 is a similar section, but illustrating the manner in which the power source may be connected to the unit through the cover plate thereof.

Referring to the drawings, an electricity conductor unit 10, according to the present invention, is shown in Figure 1 as a unit of a seriatim interconnected wiring system embodying units 10, 10. Said run of units, illustratively, is mounted on the baseboard of a room; the baseboard had been provided with a conventional electricity outlet box 12, and from the power-source conductors within such outlet box, a concealed lead 14 of BX cable or equivalent has been run to interconnect the conductors of the unit 10, as hereinafter more fully set forth.

In Figure 2, the arrangement is similar, except that installation conditions have rendered it more advantageous to interconnect the conductor unit 10 by means of an exposed lead 15 taken out of the outlet 12 by a conventional attachment plug, and introduced into the unit 10 through the cover plate thereof.

Referring to Figures 4 and 6, the unit 10 may comprise a two-part structure in which a substantially hollow cap member 16 has three major wall surfaces, and is enclosed by a base member 17, desirably fitting within the confines of the cap member intermediate the side walls thereof.

Said cap and base members may be formed of electrical insulation material such as a suitable moldable plastic, thereby combining attributes of dielectric and aesthetic qualities.

As illustrated in Figures 3 and 4, the cap member 16 is provided with a pocket or connection well 18, within which are preferably integral wall means, illustratively an S-shaped barrier 21, which serves to isolate the bus bar connector portions of the electricity conductors of the unit, as later appears. A suitable closure cap 20 may be employed. As appears in Fig. 4, the sinous wall 21 serves to support the closure cap 20 substantially throughout its area; said cap 20 is therefore supported not only about its periphery, but also over its major portion.

The base member 17 is formed with a suitable aperture 23, preferably arranged beneath the center of the pocket 18; said aperture 23 is in registry with a divided aperture 24 provided in the rear wall 25 of the pocket.

Removably associated with such base member 17, so as to be optionally usable with the unit, is a saddle 26 having any suitable provision for the attachment of a BX cable connector 27; such saddle 26 may be stamped out of metal and formed with open slots 28, 28 for the accommodation of the machine screws illustrated. The saddle 26 affords a highly satisfactory method of securing a BX cable and protecting the conductors thereof.

The cap member 16 is formed with a suitable plurality of transverse walls 30, having aligned grooves within which are supported electricity conductors 31 terminating within the area defined by the connection well 18, as appears in Figures 4 and 6.

The conductors 31 rest upon said transverse walls, and are held in place by the base 17 which fits snugly thereagainst. Any suitable number of such transverse walls 30 may be formed with a boss having a tapped opening, to accommodate a machine screw or the like for securing the base 17 to cap member 16.

The unit 10 has been illustrated as of an outlet-provided type, but it obviously is not so restricted. To provide such outlet facilities, the facing wall of the cap member 16 has a suitable number of pairs of apertures, and secured to the conductors 30 in registry with such apertures, are suitable contact devices 30a.

The rear wall 25 of the pocket 18 has, near each of its ends, a suitable plurality of openings 32 beneath which the conductors 30 terminate. Said openings provide for the connection with conductors 30 of like polarity, of a bus bar 33, of which collars 34, 34 are adapted to engage and make contact with the ends of the conductors 31. As is evident, said collars 34 are substantially wholly beneath the base wall of the pocket 18, and the ends of the bus bar 33 extend upwardly through the apertures 32 to position the bus run 35 within said pocket 18 at the side walls thereof. Bus bar 33 has a connection plate 36 in which a tapped hole 37 accommodates a binding screw 38, and a hole 39 provides for a machine screw 40 which may be employed to secure each bus bar to the base wall of the pocket 18.

In connecting the unit to the conductors of BX cable, such conductors are brought through the openings 24 in the base of the pocket 18 and are connected to the respective bus bars 33, as clearly appears in Figures 3 and 4. It is obvious that the wall means 21 in said pocket 18 precludes any possibility of short circuiting the power conductors, and the protection afforded by such wall 21 also protects the installer of the unit against electric shock.

If BX is not used in the building, power source wires of whatever type may be brought directly into the unit through the aperture 23, and in such circumstances the saddle 26 may be dispensed with.

In installations of the "alteration" type, that is, installations in completed buildings where electricity outlets have been provided and structural difficulties render connection to concealed building wiring impracticable, the invention, in its illustrated form provides for interconnecting the unit 10 with the building power source through the front of the unit, by the expedient of a relatively short plug and wire assembly 15 which may connect to the power source by a conventional attachment plug. To afford interconnection of such short lead 15 with the unit 10, I provide a knock-out 42 in the closure cap 20. The membrane portion of the knock-out may be broken away, see Fig. 9, leaving an aperture through which the lead 15 may pass for interconnection with the bus bars 33 of the unit.

It will be observed that substantial advantages accrue from arranging the connection plate 36 of the bus bars 33 remote from the conductors 31. By so doing, ample room is afforded for the connection of the feed conductors, while compacting the unit into a small cross section, and the connection plates 36 are completely accessible, while disposing the conductors 31 near the base of the unit and thereby simplifying the employment of contact devices 30a when an outlet-provided unit is desired.

Whereas I have described my invention by reference to specific forms thereof, it will be understood that many changes and modifications may be made without departing from the spirit of the invention.

I claim:

1. An electricity conductor unit of the type described, comprising a substantially hollow body of electrical insulation material having a member formed with a pocket intermediate the ends thereof, a plurality of longitudinally extending electricity conductors mounted within said member beneath said pocket and having termini within the area defined by said pocket, such termini of electricity conductors of identical polarity being in spaced relationship, bus bar means disposed within said pocket for connecting said conductor means of identical polarity, a base for said pocket having an aperture for the entry of power feed means into said pocket for connection to said bus bar means, and a cover plate for said pocket having knock-out means affording an optional method of introducing such power feed means into said pocket for connection to said bus bar means.

2. An electricity conductor unit of the type described, comprising a substantially hollow body of electrical insulation material having a cap member formed with a pocket intermediate the ends thereof, closure means for said pocket, a plurality of longitudinally extending electricity conductors mounted in said cap member beneath said pocket, bus bar means for interconnecting electricity conductors of like polarity and having a connection member positioned within said pocket, means for connecting electricity conductors from a power source to said bus bar means optionally through the rear or the front of said unit, insulating wall means separating bus bar means of different polarity, a base member adapted to cooperate with said cap member and to secure said electricity conductors therein, and means for securing said cap and base member.

3. An electricity conductor unit of the type described, comprising a substantially hollow body of electrical insulation material formed with a pocket intermediate the ends thereof, electricity conductors extending longitudinally of said body and having termini within the boundaries of said pocket but beneath an insulating base wall thereof, the termini of electricity conductors of identical polarity being in spaced relationship, bus bar means connecting said conductor means of identical polarity and exposed within said pocket, means for connecting electricity conductors from a building power source to said bus bar means, and means for bringing said power source conductors into said pocket optionally from the rear or front of the unit.

4. An electricity conductor unit of the type described, comprising a body of electrical insulation material having connection well means intermediate the ends thereof, electricity conductors insulatedly mounted within said body and having termini within the area defined by said well means but beneath the base thereof, bus bar means connecting conductor means of identical polarity and extending upwardly through said base for disposition of a major portion within said well means, means for connecting electricity conductors to said bus bar means from beneath said well means, and a cover plate for said well means having means affording the introduction of said electricity conductors thereinto through such cover means.

5. An electricity conductor unit of the type described, comprising an elongated substantially hollow body of electrical insulation material provided with connection well means accessible from the front of the unit, electricity conductors extending longitudinally of said body in insulated spaced relationship beneath said connection well means and having termini in registry with apertures formed in a base wall thereof, bus bar means disposed within said connection well and extending through said apertures to connect with said electricity conductors, means for connecting electricity conductors from a building power source to said bus bar means, and means for bringing said power source conductors into said connection well optionally from the front or the rear of the unit.

6. A feed unit for an electric wiring system, comprising a body having a base, a connection well disposed intermediate the ends of the body and having a rear wall of insulation material disposed above the base of the body, an electric conductor insulatedly supported within said body and beneath the rear wall of said connection well, electricity conductor means disposed within said connection well and having connector plates secured to the rear wall of said connection well for attachment to power source leads introduced into said connection well, terminal portions of said conductor means passing through said rear wall to connect with the first named electricity conductors and a cover plate for said connection well.

7. A feed unit for a wiring system, comprising a body, electricity conductors supported within said body and extending longitudinally thereof, a connection well disposed intermediate the ends of said body and accessible from the front thereof, connection posts within said connection well and in contact with said electricity conductors, means for introducing electricity conductors into said connection well from the rear for connection to said connection posts, a wall of electrical insulation material extending between said connection posts, said wall being of substantial height to electrically isolate said connection posts, and a removable cover plate for said connection well supported peripherally upon the front wall of said body and over a substantial portion of its area by said wall of electric insulation material.

8. An electricity conductor unit of the type described, comprising a substantially hollow body of electrical insulation material having a body member formed with a pocket intermediate the ends thereof, a plurality of longitudinally extending electricity conductors mounted within said body member beneath said pocket and having terminals within the area defined by said pocket, said terminals of electricity conductors of identical polarity being in spaced relationship, bus bar means disposed within said pocket and having terminals extending through rear wall of said pocket for connecting said conductor terminals of identical polarity, a wall of said pocket having an aperture for the entry of power feed conductors into said pocket for connection to said bus bar means, and a cover plate for said pocket disposed on the front wall of said body.

9. An electricity conductor unit of the type described, comprising a substantially hollow body of electrical insulation material having a cap member formed with a pocket intermediate the ends thereof, closure means for said pocket, a plurality of longitudinally extending electricity conductors mounted in fixed spaced insulated relationship within said cap member beneath said pocket, bus bar means connected to said conductors and having a connection member positioned within said pocket, means for introducing electricity conductors from a power source into said pocket and for connecting said conductors to said bus bar means, insulating wall means within said pocket for separating bus bar means of different polarity, a base member adapted to cooperate with said cap member to secure said electricity conductors therein, and means for securing said cap and base members.

10. An electricity conductor unit, comprising a substantially hollow body having a cap member and a base member, a connection well provided in said cap member, the rear wall of said connection well being disposed above the said base member, electricity conductors within said unit and extending longitudinally thereof beneath the rear wall of said connection well, said electricity conductors having terminal portions disposed in fixed spaced relationship at at least one end of the unit, connection means disposed within said connection well and extending through the rear wall thereof into electrical connection with the said conductors, means for introducing electricity conductors from a power source into said connection well and for the connection thereof to said connection means, and a removable cover plate for said connection well.

JOSEPH F. O'BRIEN.